(12) United States Patent
Prakash et al.

(10) Patent No.: US 7,519,214 B2
(45) Date of Patent: *Apr. 14, 2009

(54) SYSTEM AND METHOD OF DETERMINING IMAGE SKEW USING CONNECTED COMPONENTS

(75) Inventors: Ravinder Prakash, Concord, NC (US); Madhura Sathe, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/930,980

(22) Filed: Oct. 31, 2007

(65) Prior Publication Data

US 2008/0069476 A1 Mar. 20, 2008

Related U.S. Application Data

(63) Continuation of application No. 10/832,177, filed on Apr. 26, 2004, now Pat. No. 7,336,813.

(51) Int. Cl.
*G06K 9/00* (2006.01)
*G06K 9/74* (2006.01)

(52) U.S. Cl. .................... 382/139; 382/182; 356/71

(58) Field of Classification Search .......... 382/100, 382/106, 112–116, 123, 168, 135–140, 176, 382/181, 203, 232, 274, 276, 287–302, 321, 382/12, 305, 182; 705/64; 235/472.01; 356/71
See application file for complete search history.

(56) References Cited

U.S. PATENT DOCUMENTS

| | | | |
|---|---|---|---|
| 4,680,803 A | 7/1987 | Dilella | |
| 5,097,517 A * | 3/1992 | Holt | 382/137 |
| 5,144,566 A | 9/1992 | Anderson et al. | |
| 5,191,525 A | 3/1993 | LeBrun et al. | |
| 5,235,652 A * | 8/1993 | Nally | 382/112 |
| 6,178,270 B1 * | 1/2001 | Taylor et al. | 382/284 |
| 6,212,504 B1 * | 4/2001 | Hayosh | 705/64 |
| 6,351,553 B1 | 2/2002 | Hayosh | |
| 6,573,983 B1 * | 6/2003 | Laskowski | 356/71 |
| 6,654,487 B1 | 11/2003 | Downs, Jr. | |
| 6,681,994 B1 * | 1/2004 | Koenck | 235/472.01 |
| 2002/0037097 A1 | 3/2002 | Hoyos et al. | |
| 2003/0059099 A1 | 3/2003 | Tateishi | |

OTHER PUBLICATIONS

M.S. Narasimha et al., "Graphical Interface for Image Attribute Specification", IBM Technical Disclosure Bulletin, vol. 34 No. 11, Apr. 1992, pp. 374-375.

(Continued)

*Primary Examiner*—Seyed Azarian
(74) *Attorney, Agent, or Firm*—Douglas Lashmit; Hoffman Warnick LLC

(57) ABSTRACT

A system and method for determining skew of a document image. An image processing system is provided, comprising: an image segmentation system that identifies and segments a line of printed characters; and a skew processing system that determines the skew by calculating slope values for pairs of characters in the line.

18 Claims, 8 Drawing Sheets

OTHER PUBLICATIONS

Xerox: The Document Company, "Generic MICR Fundamentals Guide", 720P14083, Jun. 1998, pp. 1-134.

Jeff Russell, "What is MICR", Color Imaging Inc., www.rechargeast.com/protected/en/specialists_guide/3/micr.html, pp. 1-15, (2004).

Elfring Fonts, "What is MICR", www.micrfonts.com/what.htm, pp. 1-2, (2004).

Morovia, "MICR E-13B Fontware", http://morovia.com/font/micr.asp, Apr. 4, 2003, pp. 1-4.

* cited by examiner

| Comp # | Micr char | TopLx | TopLy | BottomRx | BottomRy | Slope in degrees |
|---|---|---|---|---|---|---|
| 0 | 0 | 87 | 466 | 105 | 489 | 0 |
| 1 | 8 | 112 | 465 | 130 | 489 | 0 |
| 2 | 1 | 145 | 465 | 156 | 489 | 0 |
| 3 | 9 | 165 | 465 | 181 | 489 | 0 |
| 4 | 0 | 188 | 465 | 206 | 489 | 0 |
| 5 | 4 | 216 | 465 | 231 | 488 | -2.28 |
| 6 | 8 | 238 | 465 | 256 | 488 | 0 |
| 7 | 0 | 263 | 465 | 281 | 489 | 2.28 |
| 8 | 8 | 288 | 465 | 306 | 488 | -2.28 |
| 9 | 0 | 364 | 465 | 382 | 489 | 0.75 |
| 10 | 1 | 397 | 465 | 407 | 488 | -2.28 |
| 11 | 1 | 422 | 465 | 432 | 489 | 2.28 |
| 12 | 5 | 444 | 465 | 457 | 489 | 0 |
| 13 | 0 | 464 | 466 | 482 | 490 | 2.28 |
| 14 | 8 | 489 | 466 | 507 | 490 | 0 |
| 15 | 0 | 515 | 466 | 532 | 490 | 0 |
| 16 | 0 | 540 | 466 | 557 | 490 | 0 |
| 17 | 5 | 570 | 466 | 583 | 490 | 0 |
| 18 | 0 | 590 | 466 | 608 | 490 | 0 |
| 19 | 8 | 615 | 465 | 633 | 489 | -2.28 |
| 20 | 9 | 643 | 466 | 658 | 490 | 2.28 |
| 21 | 6 | 718 | 466 | 733 | 490 | 0 |
| 22 | 8 | 765 | 465 | 783 | 489 | -1.14 |
| 23 | 8 | 791 | 465 | 809 | 489 | 0 |
| 24 | 0 | 867 | 472 | 885 | 496 | 5.25 |
| 25 | 0 | 892 | 473 | 909 | 496 | 0 |
| 26 | 0 | 916 | 473 | 934 | 496 | 0 |
| 27 | 0 | 941 | 473 | 959 | 496 | 0 |
| 28 | 0 | 966 | 473 | 984 | 496 | 0 |
| 29 | 0 | 991 | 474 | 1008 | 497 | 2.375 |
| 30 | 1 | 1023 | 474 | 1033 | 497 | 0 |
| 31 | 6 | 1042 | 474 | 1058 | 497 | 0 |
| 32 | 0 | 1064 | 474 | 1082 | 497 | 0 |
| 33 | 0 | 1089 | 474 | 1107 | 497 | 0 |

FIG. 9

| Comp # | MICR char | TopLx | TopLy | BottomRx | BottomRy | Slope in degrees (column G) |
|---|---|---|---|---|---|---|
| 1 | 0 | 110 | 559 | 133 | 588 | |
| 2 | 0 | 138 | 560 | 161 | 590 | 4.071428571 |
| 3 | 0 | 167 | 561 | 190 | 590 | 0 |
| 4 | 0 | 196 | 562 | 219 | 592 | 3.931034483 |
| 5 | ? | 228 | 563 | 246 | 593 | 2.111111111 |
| 6 | 7 | 259 | 564 | 276 | 593 | 0 |
| 7 | 8 | 282 | 565 | 303 | 595 | 4.222222222 |
| 8 | 9 | 313 | 566 | 333 | 596 | 1.9 |
| 9 | 4 | 342 | 567 | 361 | 597 | 2.035714286 |
| 10 | 0 | 427 | 570 | 450 | 599 | 1.280898876 |
| 11 | 9 | 460 | 571 | 479 | 601 | 3.931034483 |
| 12 | 0 | 485 | 572 | 508 | 602 | 1.965517241 |
| 13 | 1 | 553 | 575 | 567 | 604 | 1.93220339 |
| 14 | 1 | 582 | 576 | 595 | 605 | 2.035714286 |
| 15 | 1 | 610 | 577 | 624 | 607 | 3.931034483 |
| 16 | 1 | 669 | 580 | 683 | 609 | 1.93220339 |
| 17 | 2 | 698 | 581 | 713 | 609 | 0 |
| 18 | 1 | 726 | 583 | 740 | 613 | 8.444444444 |

SYSTEM AND METHOD OF DETERMINING IMAGE SKEW USING CONNECTED COMPONENTS

This continuation application claims priority to patent application Ser. No. 10/832,177 filed on Apr. 26, 2004, now U.S. Pat, No. 7,336,813 entitled "SYSTEM AND METHOD OF DETERMINING IMAGE SKEW USING CONNECTED COMPONENTS," the contents of which is hereby incorporated by reference.

BACKGROUND OF THE INVENTION

1. Technical Field

The present invention relates generally to processing document images, and more specifically relates to a system and method for measuring a skew of an image by analyzing the slope of printed information in the image.

2. Related Art

Handling and processing document images is becoming more and more important with the advancement of electronic commerce in environments such as banking. For example, under the "Check 21 Act," which goes into law in October of 2004, banks will be allowed to exchange check images, without actually having to present the original check, for conducting transactions. An important challenge for handling such images includes measuring the image quality of the check. If for example, the check code line, which contains account information and the like, cannot be read, the image must be identified as being unacceptable. Given the high volume of checks that will be processed electronically, automated systems that efficiently measure image quality are required.

One important area of image quality involves document skew. The ability to accurately measure skew can help determine whether printed information can be accurately read in an automated fashion. Too much skew may indicate that the document is unacceptable and/or needs correction before the data can be read.

Known methods for measuring skew typically rely on use of the scanned document image edges to establish image skew. However, it is not unusual for images to be cropped such that the document edges have been removed. In these cases, skew measurements cannot be reliably obtained. Accordingly, a need exists for a system and method for measuring a skew angle of a black white document image.

SUMMARY OF THE INVENTION

The present invention addresses the above-mentioned problems, as well as others, by providing a system and method for measuring the skew of a black white image by analyzing the slope of, for example, MICR (Magnetic Ink Character Recognition) characters printed in the image. The described technique can be used with any printed string of characters. In a first aspect, the invention provides an image processing system for determining a skew of a document image, comprising: an image segmentation system that identifies and segments a line of printed characters; and a skew processing system that determines the skew by calculating slope values for pairs of characters in the line.

In a second aspect, the invention provides a method for determining a skew of a document image, comprising: identifying and segmenting a line of printed characters in the document image; and determining the skew of the document image by calculating slope values for pairs of characters in the line.

In a third aspect, the invention provides a program product stored on a recordable medium for determining a skew of a document image, comprising: means for identifying and segmenting a line of printed characters on the document image; and means for determining the skew of the document image by calculating slope values for pairs of characters in the line.

In a fourth aspect, invention provides an image processing system for determining a skew of a document image, comprising: a system for inputting a segmented set of printed characters; a system that calculates slope values for pairs of characters in the set; and a system that identifies a median slope value among all the calculated slope values.

BRIEF DESCRIPTION OF THE DRAWINGS

These and other features of this invention will be more readily understood from the following detailed description of the various aspects of the invention taken in conjunction with the accompanying drawings in which:

FIG. 5 depicts a set of connected components that includes a MICR code line taken from the document image in accordance with the present invention.

FIG. 6 depicts a further reduced set of the connected components of FIG. 5.

FIG. 9 depicts a table of component data for the MICR code line of FIG. 7.

DETAILED DESCRIPTION OF THE INVENTION

Figure 1:
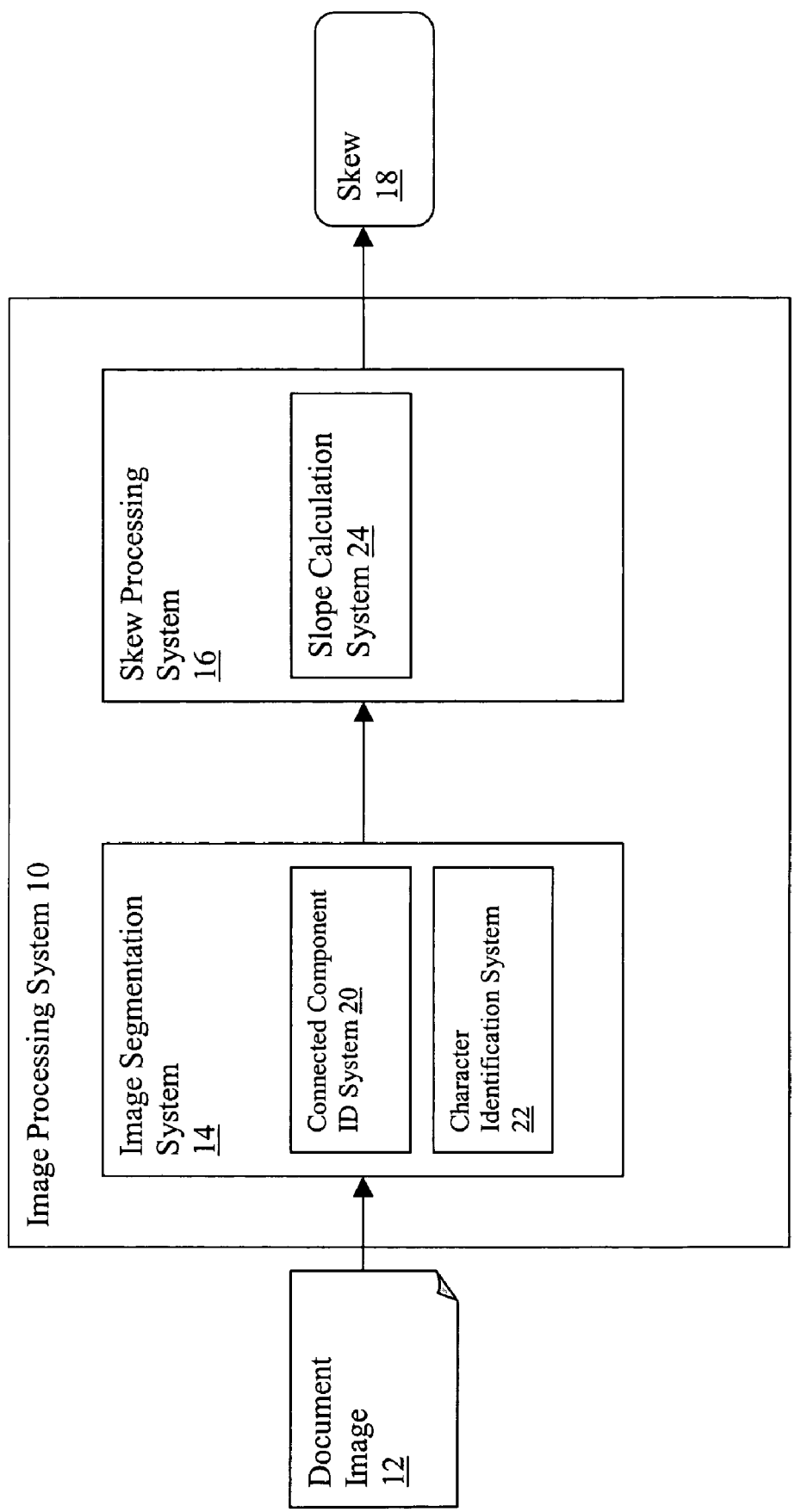
FIG. 1 depicts an image processing system in accordance with the present invention.

Referring now to the drawings, FIG. 1 depicts an image processing system 10 that reads in a document image 12 and outputs a skew value 18 of the document. In general, document image 12 comprises a black white image, however, it should be noted that the invention could be applied to any bitonal image. Image processing system 10 includes: (1) an image segmentation system 14 that identifies and segments printed characters, and (2) a skew processing system 16 that calculates the skew value 18 based on slope calculations for pairs of segmented characters.

In the development of any optical character reader (OCR) engine, an important challenge is in image segmentation. Simply stated, if one can carve out characters, without any background pollution, machine readability becomes easy. For example, to read the code line from the check shown in FIG. 2, the main challenge is in extracting the code line as shown in FIG. 3, followed by separation into individual characters.

Figure 4:
FIG. 4 depicts a set of connected components taken from the document image in accordance with the present invention.

In one illustrative embodiment of the present invention, image segmentation system 14 utilizes a connected component identification system 20 that first identifies all of the connected components in the image. For example, in the check shown in FIG. 2, there are 334 connected components. The connected components are defined as printed areas where more than one black pixel is touching; diagonally connected pixels may also be considered touching. For example, FIG. 4 depicts five connected components that form a cable-like border taken from the left side of the check image. Any method for identifying connected components in the document image 12 could be utilized. Information about each connected component is then stored as part of a data set that defines the component. For instance, the data set may include a component number, a pixel size, a width, a height, and positional data such as a top left X-axis coordinate, a top left Y-axis coordinate, a bottom right X-axis coordinate, a bottom right Y-axis coordinate, etc.

Character identification system 22 utilizes the connected component information to identify and segment characters from the document image 12, e.g., MICR characters contained in the code line. To achieve this, character identification system 22 applies a set of rules to identify a desired subset of connected components. All other components are eliminated from the component data set. Any appropriate set of rules can be utilized for this process.

Figures 2, 3:
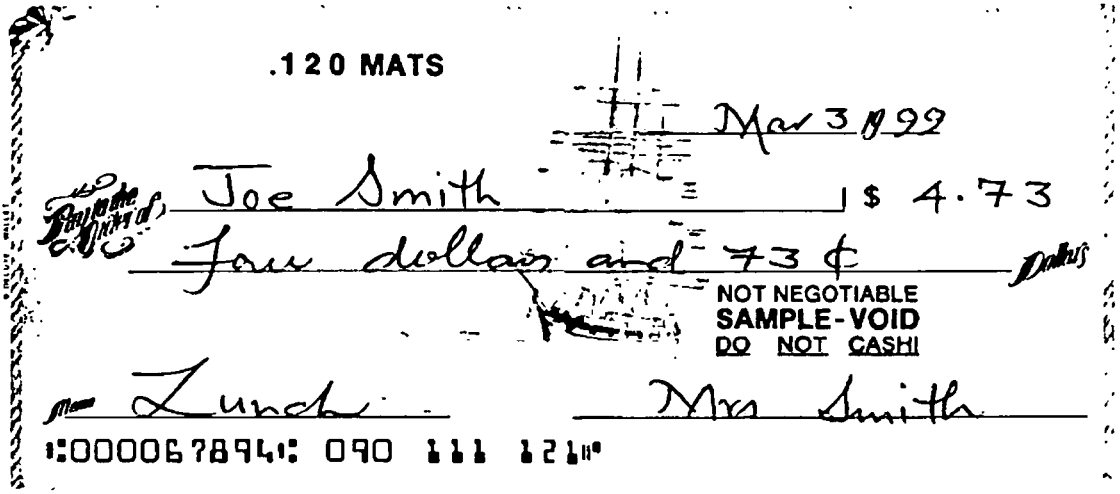
FIG. 2 depicts an exemplary document image.
FIG. 3 depicts a MICR code line.

For instance, the MICR code line of the check shown in FIG. 2 is identifiable as being printed in a defined area of the check, namely the bottom ⅝ of an inch, i.e., 150 pixels at 240 dpi. In this embodiment, the bottom 190 pixels are taken for analysis. Thus, to identify the MICR code line, character identification system 22 first identifies those connected components that fall in a relevant region of the image, i.e., those in the bottom 190 pixels. This results a reduced data set of components, shown graphically in FIG. 5.

In a next step, character identification system 22 examines the reduced data set and compares each of the resulting components to predetermined size criteria. For instance, only the components satisfying the MICR character height (0.116 inch or approximately 28 pixels at 240 dpi) are considered. In this case, components with feature height in the range of 26 to 30 pixels (28+/−2) are extracted, which results in a further reduced data set, shown graphically in FIG. 6.

In a further step, the top left X-axis coordinate of the component is considered. Since the printing margin must be a minimum of 0.236 inches, i.e., approximately 60 pixels, any component with top left location of less than 50 pixels is discarded. Similarly, the right edge is considered. It is required that the bottom right X-axis coordinate of the right most component must be placed at least 60 pixels away from the document right edge (in this case, 1432 pixels). All components in this example satisfy this requirement. The corresponding image is shown in FIG. 6. Next, the code line can be segmented into individual components that are then subjected to OCR and/or further processing.

In this embodiment, once the relevant character data in image 12 has been segmented by image segmentation system 14, the segmentation information can be passed to skew processing system 16 to determine the rotational skew of the image 12. To implement this, the slopes of different pairs of components are calculated by slope calculation system 24. In one illustrative embodiment, individual slope values of adjacent code line character pairs are determined. The outputted document skew 18 is then determined by taking the median of the individually calculated slopes.

In a typical check, the code line includes printed MICR characters that comprise a plurality of fields, which are not always printed at the same time. Accordingly, in some cases, these fields can be vertically misaligned. However, because the described invention uses a median slope value of adjacent character pairs, as described herein, the discrepancy can be overcome.

Figure 7:
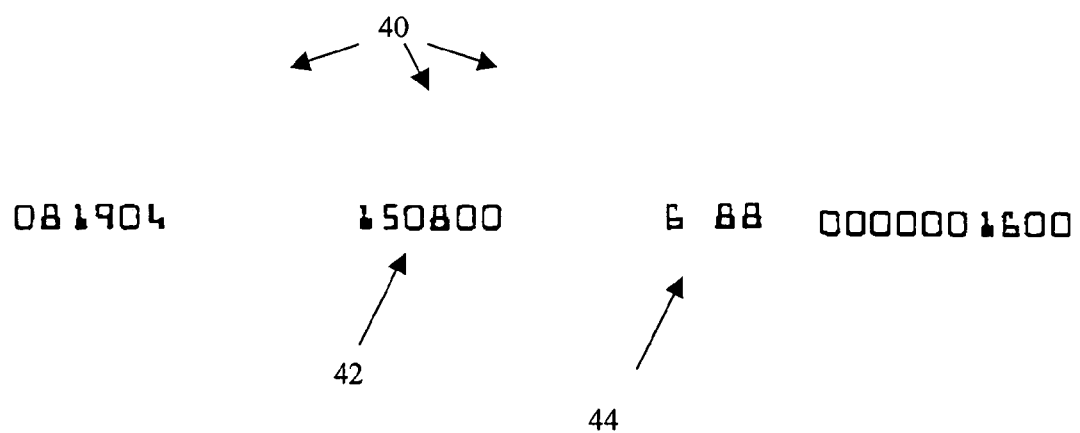
FIG. 7 depicts the MICR code line taken from connected components of FIG. 6.

Consider the MICR code line 40 shown in FIG. 7. It can be seen that the account number 42 has been considerably shifted. In addition, note that the second character ("6 88") is missing in the third field from the left, because, e.g., the character did not satisfy the height and width criterion of the image segmentation system 14. Such failures do not present a problem for the skew angle processing system 16.

Figure 8:
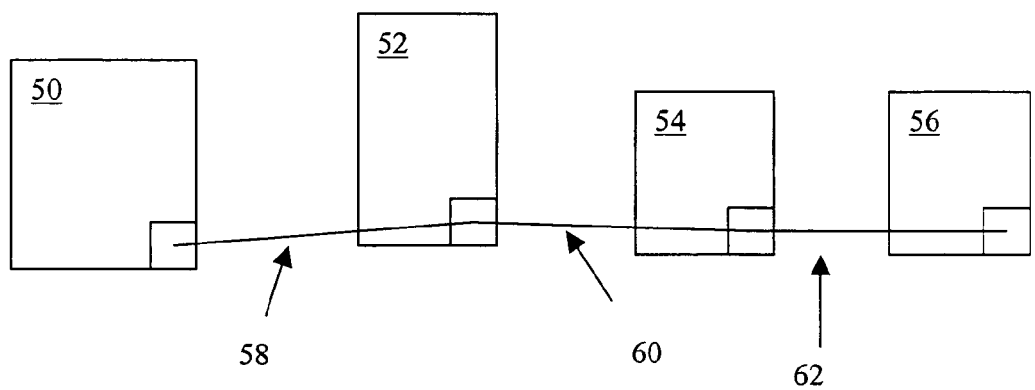
FIG. 8 depicts two respective slopes determined from three exemplary connected components.

Skew angle processing system 16 includes a slope calculation system 24 that calculates a slope value for each consecutive character pair using, e.g., the bottom right X-axis coordinate and bottom right Y-axis coordinate for each character, which will ensure an accurate calculation due to the consistency of the vertical coordinate of each of the MICR characters. FIG. 8 depicts a simplified example that includes four connected components 50, 52, 54 and 56, which have been identified as characters of a MICR code line. First, three slope values 58, 60 and 62 are calculated by examining the bottom right location of consecutive components 50/52, 52/54 and 54/56. Then, a median value is calculated, and outputted as the skew 18 for the document image 12.

FIG. 9 depicts a data set that includes the slope for each of the 34 components (i.e., characters) of the code line 40 shown in FIG. 7. The median slope value can be determined in any known manner, e.g., the slope values can be arranged either in ascending or descending order to determine the median. Note that due to the significant vertical shift in the account number field 42, the slope between individual component #23 (MICR char 8) and component #24 (MICR char 0) is 5.25 degrees. However, since the account number field 42 itself is almost horizontally aligned, the slope between the components (#25&#26), (#26&#27), (#27&#28) is 0. Using this median technique helps discard such shifts that are introduced.

These principles can be used to determine skew for any document image that includes printed characters, or connected components that are known to lay in a horizontal, vertical or uniform manner. For instance, instead of using the MICR code line, the address block printed on the left top region of a check could be used to determine the skew angle. In this case, by taking a horizontal projection of the address window, different lines of the address block can be identified. Looking at one line, similar calculations as above can be used to determine the skew angle.

Skew measurements based on the address block works very well with block letters. In case of lower case characters, with only a few characters having descender strokes, the median concept works effectively to provide the slope of the written text and thus the document skew.

Figure 10:
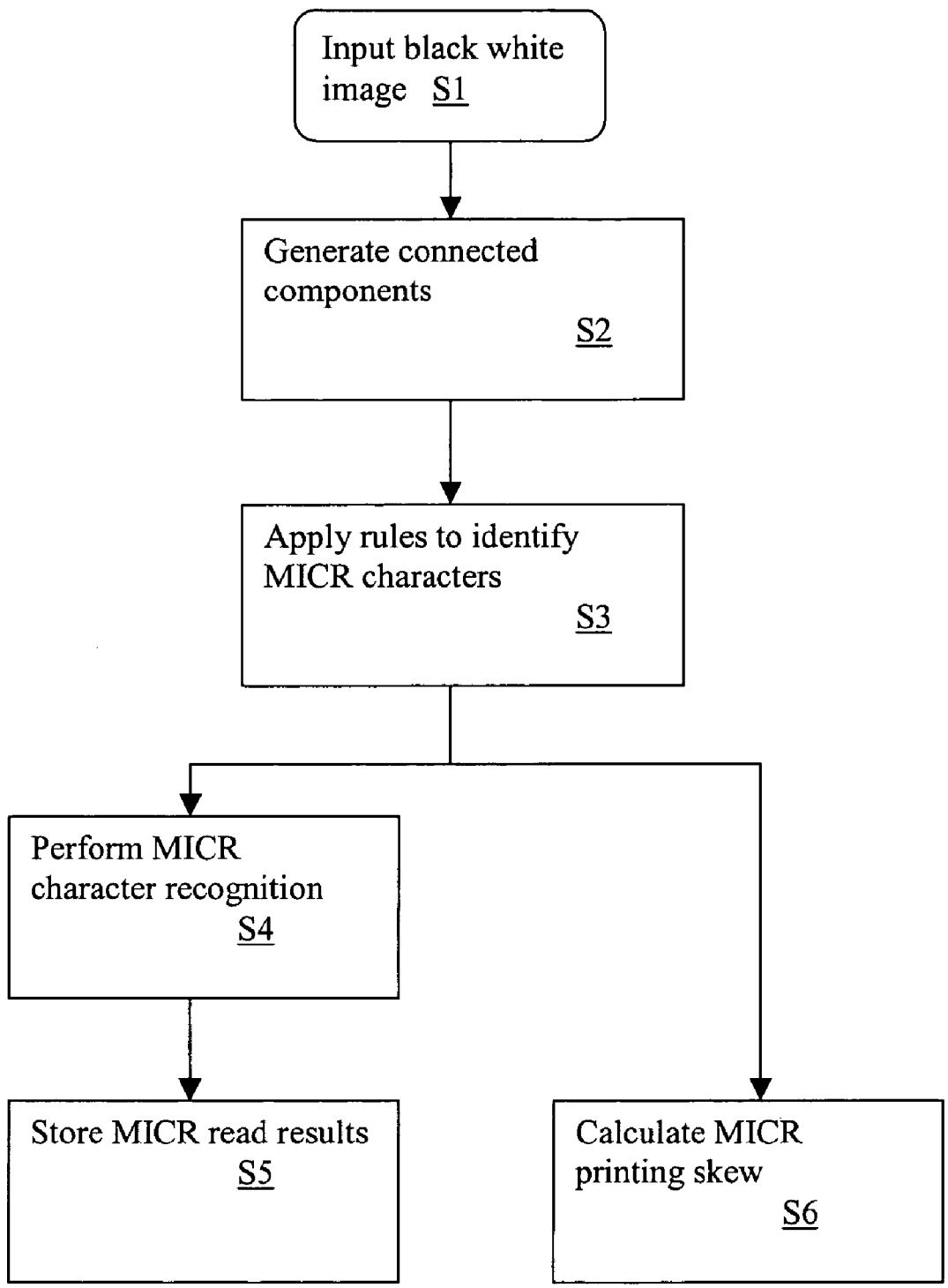
FIG. 10 depicts a flow diagram of an OCR process in accordance with the present invention.

FIG. 10 depicts a flow diagram showing how the process may be implemented in a typical OCR application. At step S1, a black white image is inputted. At step S2, connected components from the black white image are identified and generated. Next, at step S3, rules (e.g., size, location, etc.) are applied to identify MICR characters from the set of connected components. At this point, two operational paths may occur in parallel. In a first path, shown at steps S4 and S5, MICR character recognition is performed and the MICR read results are stored. In a second path, shown at step S6, the MICR printing skew is calculated as described herein.

Figures 11, 12:
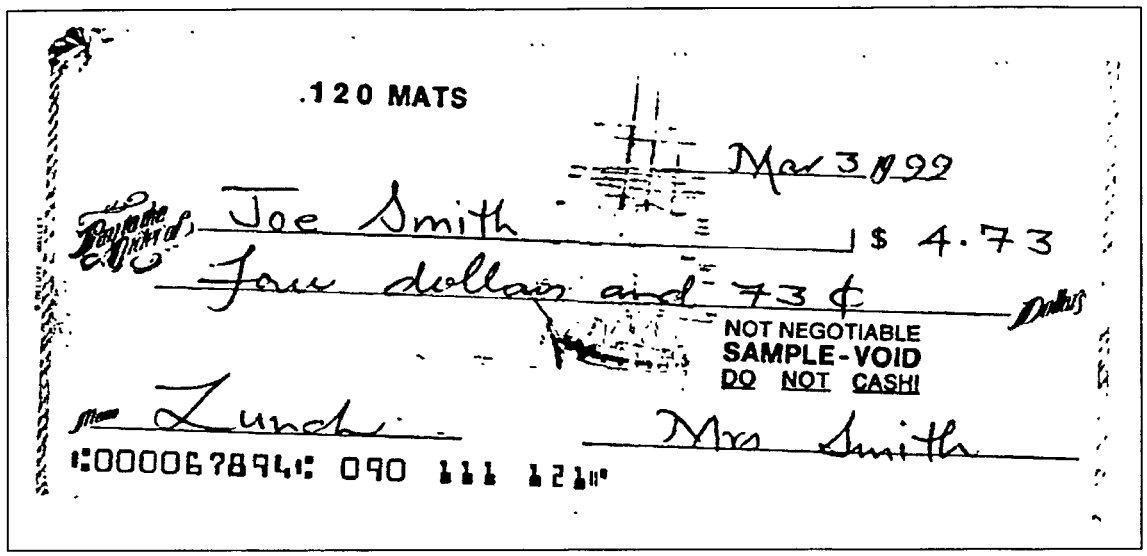
FIG. 11 depicts a skewed check image.
FIG. 12 depicts a data set table containing slope values for the segmented MICR characters obtained from the skewed check image of claim 11.

FIGS. 11-14 describe a further example of calculating skew based on a median slope value. FIG. 11 depicts a skewed check image. As is typically the case, the MICR printed characters (in the code line at the bottom of the image) are right justified at a pitch of 0.125". A data set (in the form of a table) is depicted in FIG. 12 that shows 18 connected components, corresponding to 18 characters of the MICR code line. Note that any special symbols in the code line are excluded. In this case, the recognition algorithm successfully read every character except #5; which was the printed number "6" in the MICR code line. Column G shows the measured slope of the line joining the character's bottom right corner to the previous character's bottom right corner. Thus, the slope between character #2 and character #1 is 4.071428571 degrees.

Figure 13:
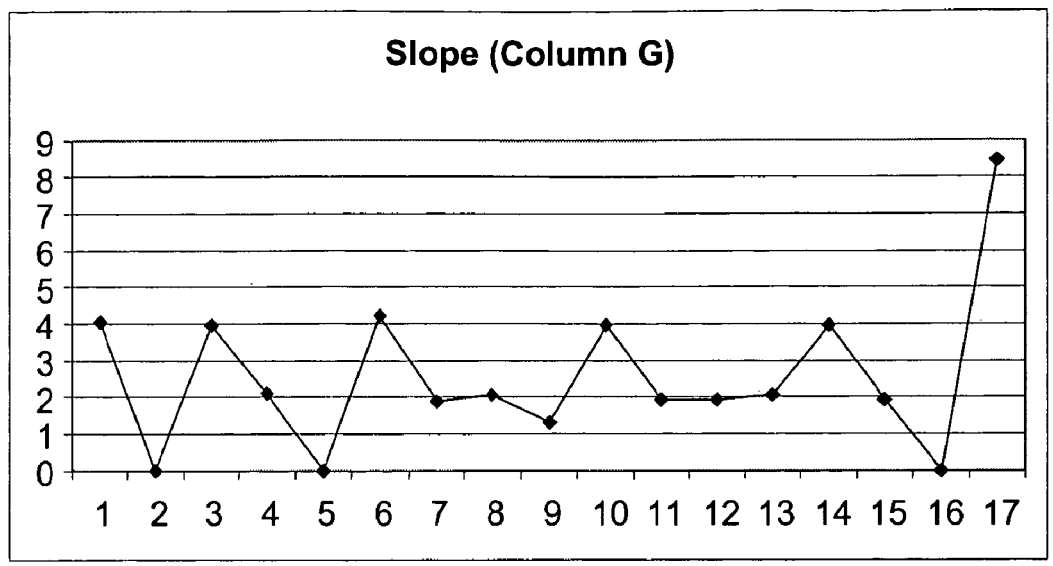
FIG. 13 depicts a graph of the slope values from the data set table of FIG. 12.
Figure 14:
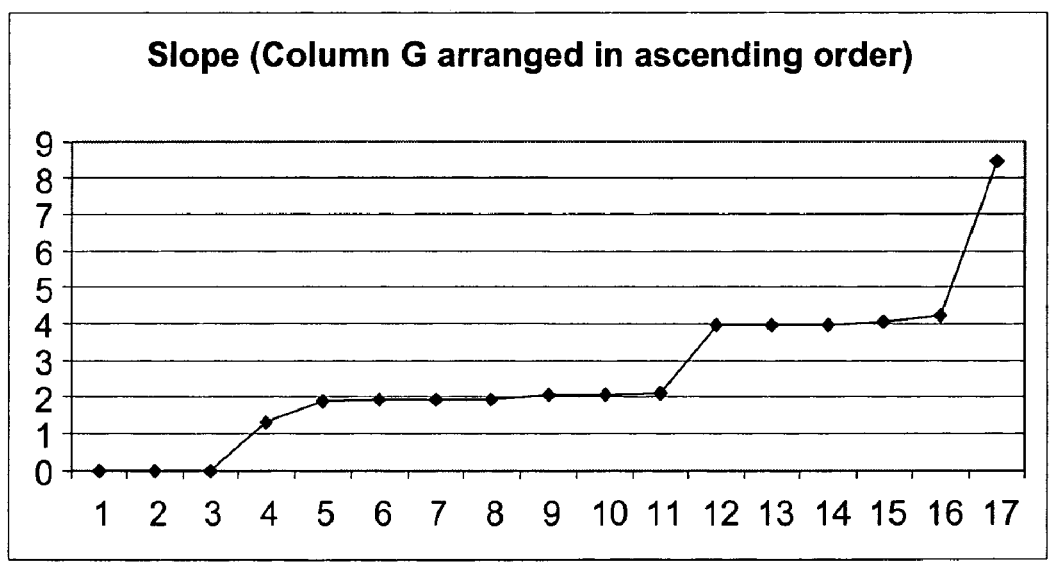
FIG. 14 depicts a graph of the slope values of FIG. 13 placed in ascending order.

FIG. 13 depicts a graph showing the angle in degrees of each calculated slope. In FIG. 14, the results from column G are placed in ascending order and plotted. As can be seen, the median of the data shows a skew of 2 degrees, and corresponds to data point #8. To further reduce the video noise sensitivity, the skew corresponding to data points #8 (skew of 1.966) and #9 (skew of 2.036) could be averaged, leading to a result of 2.001 degrees.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. An image processing system for determining a skew of a document image, comprising:
  an image segmentation system that identifies and segments a line of printed characters captured from the document image, wherein the image segmentation system identifies and segments the line of printed characters by identifying connected components that reside in a predetermined region of the document image; and
  a skew processing system that determines the skew of the document image by calculating a slope value between a pair of characters in the line.

2. The image processing system of claim 1, wherein each pair of characters comprises a first and a second character printed adjacent to each other.

3. The image processing system of claim 1, wherein the skew is further determined based on a median slope value calculated from each of the pairs of characters in the line.

4. The image processing system of claim 1, wherein the slope value for each pair of characters is calculated based on a position of a lower right coordinate of each character in the pair.

5. The image processing system of claim 1, wherein the document image comprises a black white image.

6. The image processing system of claim 1, wherein the line of printed characters comprises a magnetic ink character recognition (MICR) code line.

7. A method for determining a skew of a document image, comprising: one or more processors for identifying and segmenting a line of printed characters on the document image, wherein the step of identifying and segmenting the line of printed characters includes the step of identifying connected components that reside in a predetermined region of the document image;
  And determining the skew of the document image by calculating a slope value between a pair of characters in the line.

8. The method of claim 7, wherein each pair of characters comprises a first and a second character printed adjacent to each other.

9. The method of claim 7, wherein the skew is further determined based on a median slope value calculated for each of the pairs of characters in the line.

10. The method of claim 7, wherein the slope for each pair of characters is calculated based on a position of a lower right coordinate of each character in the pair.

11. The method of claim 7, wherein the document image comprises a black white image.

12. The method of claim 7, wherein the line of printed characters comprises a magnetic ink character recognition (MICR) code line.

13. A program product stored on a computer readable medium for determining a skew of a document image, comprising:
  means for identifying and segmenting a line of printed characters on the document image, wherein the means for identifying and segmenting the line of printed characters includes means for identifying connected components that reside in a predetermined region of the document image; and
  means for determining the skew of the document image by calculating a slope value between a pair of characters in the line.

14. The program product of claim 13, wherein each pair of characters comprises a first and a second character printed adjacent to each other.

15. The program product of claim 13, wherein the skew is further determined based on a median slope value calculated for each of the pairs of characters in the line.

16. The program product of claim 15, wherein the slope for each pair of characters is calculated based on a position of a lower right coordinate of each character in the pair.

17. The program product of claim 15, wherein the document image comprises a black white image.

18. The program product of claim 15, wherein the line of printed characters comprises a magnetic ink character recognition (MICR) code line.

* * * * *